United States Patent
Roberts

(10) Patent No.: US 11,188,119 B2
(45) Date of Patent: Nov. 30, 2021

(54) PORTABLE COMPUTER PERIPHERAL HOLDER

(71) Applicant: International Business Machines Corporation, Armonk, NY (US)

(72) Inventor: Richard Roberts, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/574,358

(22) Filed: Sep. 18, 2019

(65) Prior Publication Data

US 2021/0080051 A1    Mar. 18, 2021

(51) Int. Cl.
| | |
|---|---|
| *G06F 1/16* | (2006.01) |
| *F16M 13/00* | (2006.01) |
| *G06F 3/033* | (2013.01) |
| *F16M 13/02* | (2006.01) |
| *F16M 11/04* | (2006.01) |

(52) U.S. Cl.
CPC ......... *G06F 1/1607* (2013.01); *G06F 1/1628* (2013.01); *G06F 1/1656* (2013.01); *F16M 11/041* (2013.01); *F16M 13/00* (2013.01); *F16M 13/02* (2013.01); *G06F 1/1613* (2013.01); *G06F 3/033* (2013.01); *G06F 2200/1613* (2013.01)

(58) Field of Classification Search
CPC .... G06F 1/1607; G06F 1/1611; G06F 1/1628; G06F 1/1656; G06F 1/1613
See application file for complete search history.

(56) References Cited

U.S. PATENT DOCUMENTS

| | | | | |
|---|---|---|---|---|
| 5,409,107 | A * | 4/1995 | Browne | G06F 3/039 206/305 |
| 6,081,422 | A * | 6/2000 | Ganthier | G06F 1/1605 348/14.01 |
| 6,476,795 | B1 * | 11/2002 | Derocher | G06F 1/1616 320/114 |
| 6,935,601 | B2 * | 8/2005 | Tanaka | B60R 7/02 224/282 |
| 7,233,319 | B2 * | 6/2007 | Johnson | G06F 1/1616 345/166 |
| 8,072,423 | B2 * | 12/2011 | Rolus Borgward | G06F 1/1618 345/157 |
| 8,614,885 | B2 * | 12/2013 | Solomon | G06F 1/1632 361/679.41 |
| 9,956,923 | B2 * | 5/2018 | Minn | F16M 13/00 |
| 2002/0117588 | A1 | 8/2002 | Lando | |

(Continued)

FOREIGN PATENT DOCUMENTS

| | | |
|---|---|---|
| CN | 101593000 B | 6/2011 |
| CN | 204790889 U | 11/2015 |

*Primary Examiner* — Nidhi Thaker

(74) *Attorney, Agent, or Firm* — Grant M. McNeilly

(57) ABSTRACT

A device holder includes a base, a hinge, and an arm. The base includes a mounting feature configured to affix the device holder to a portable computer device, and the hinge is connected to the base. The arm is connected to the hinge and opposes the base. The arm is rotatable with respect to the base to change the device holder between a stowed configuration, when the arm is positioned alongside the base, and a deployed configuration, when the first arm is positioned away from the base. In addition, the device holder is configured to hold a peripheral device of the portable computer device when the device holder is in the deployed configuration.

18 Claims, 6 Drawing Sheets

(56) References Cited

U.S. PATENT DOCUMENTS

| | | |
|---|---|---|
| 2009/0244836 A1 | 10/2009 | Leng |
| 2016/0138753 A1* | 5/2016 | Crossland ............ A47B 21/045 248/447 |
| 2016/0166060 A1* | 6/2016 | Emery ................... A47B 97/00 248/206.5 |
| 2019/0133280 A1* | 5/2019 | Gordon .................. A45C 11/00 |

* cited by examiner

PORTABLE COMPUTER PERIPHERAL HOLDER

BACKGROUND

The present invention relates to portable computers, and more specifically, to a peripheral holder for a portable computer.

Portable computers, such as laptop computers, allow users to travel with full-power workstations from place to place and rapidly set up a workspace virtually wherever they desire. Laptop computers are oftentimes used with peripheral devices, for example, computer mice or speakers. At times, for example, within an office building, portable computers are carried without the aid of a bag. In these situations, the peripheral devices accompanying the portable computers can be difficult to carry and/or keep track of, so sometimes users will forgo bringing them, making the portable computer less user-friendly.

SUMMARY

According to some embodiments of the present disclosure, a device holder includes a base, a hinge, and an arm. The base includes a mounting feature configured to affix the device holder to a portable computer device, and the hinge is connected to the base. The arm is connected to the hinge and opposes the base. The arm is rotatable with respect to the base to change the device holder between a stowed configuration, when the arm is positioned alongside the base, and a deployed configuration, when the first arm is positioned away from the base. In addition, the device holder is configured to hold a peripheral device of the portable computer device when the device holder is in the deployed configuration.

According to some embodiments of the present disclosure, a portable computer system includes a portable computer, a peripheral device that is external to the portable computer and communicatively connected to the portable computer, and a device holder that is affixed to the portable computer and configured to hold the peripheral device. The device holder includes a base, a hinge connected to the base, and an arm. The arm is connected to the hinge and opposes the base. The arm is rotatable with respect to the base to change the device holder between a stowed position, when the arm is positioned alongside the portable computer, and a deployed configuration, when the first arm is positioned away from the portable computer.

DETAILED DESCRIPTION

Figure 1:
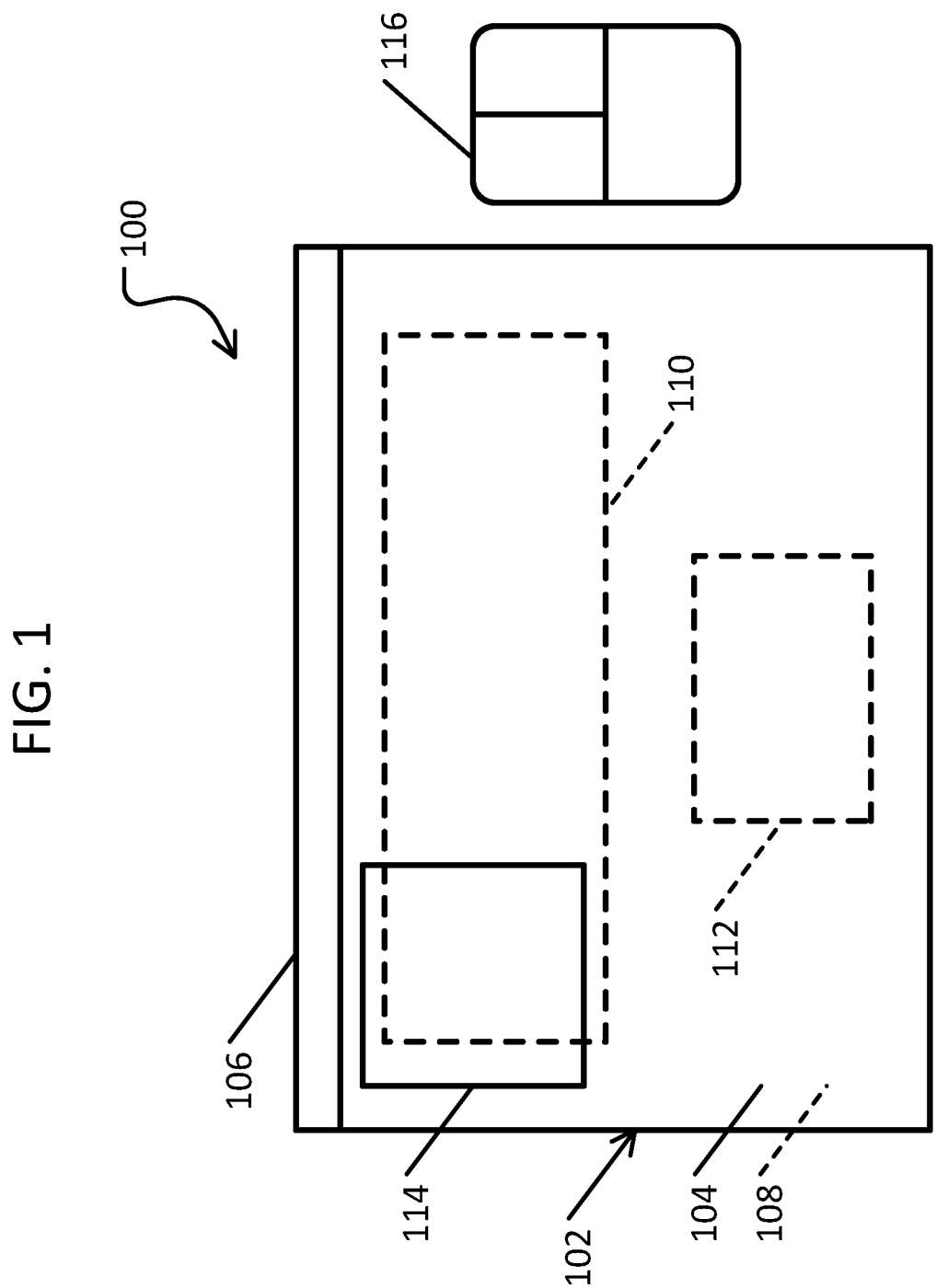
FIG. 1 is a top view of a portable laptop computer including a peripheral holder according to an embodiment of the present disclosure.

FIG. 1 is a top view of portable system 100 according to an embodiment of the present disclosure. Portable system 100 includes laptop computer 102 which comprises lid 104, hinge 106, and base 108. Base 108 includes keyboard 110 and touch pad 112. As depicted in FIG. 1, laptop computer 102 is closed for traveling.

In the illustrated embodiment, peripheral holder 114 is affixed to the exterior of laptop computer 102, specifically to lid 104. Peripheral holder 114 is configured to secure one or more peripheral components of laptop computer 102 to laptop computer 102 for traveling. Among other things, such peripherals can include, for example, mouse 116. Such capabilities prevent loss of peripheral components and allows portable system 100 to be transported one-handed by a user (not shown).

Figure 2:
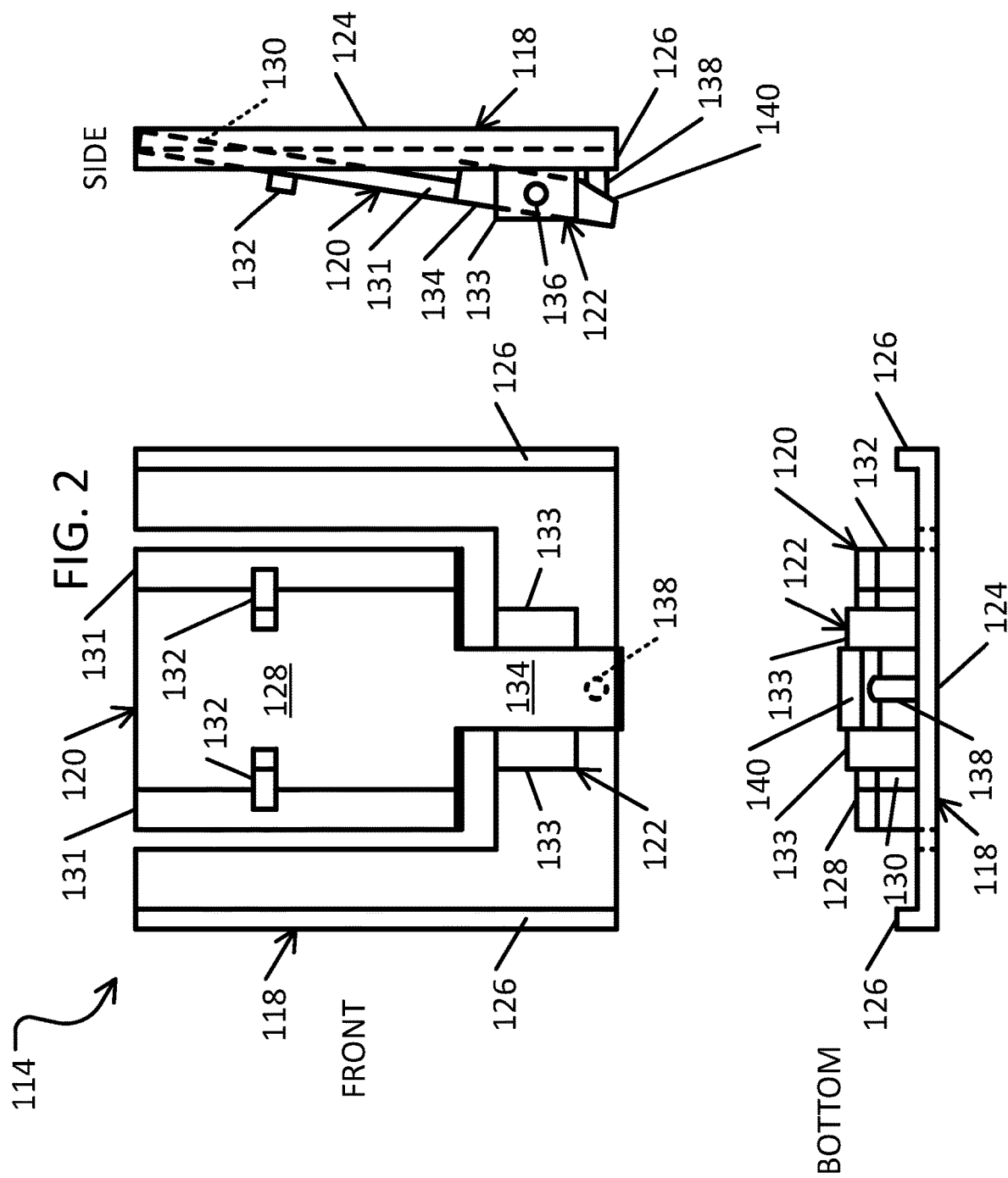
FIG. 2 is a multi-view (front, side, bottom) of the peripheral holder in a stowed configuration according to an embodiment of the present disclosure.
Figure 3:
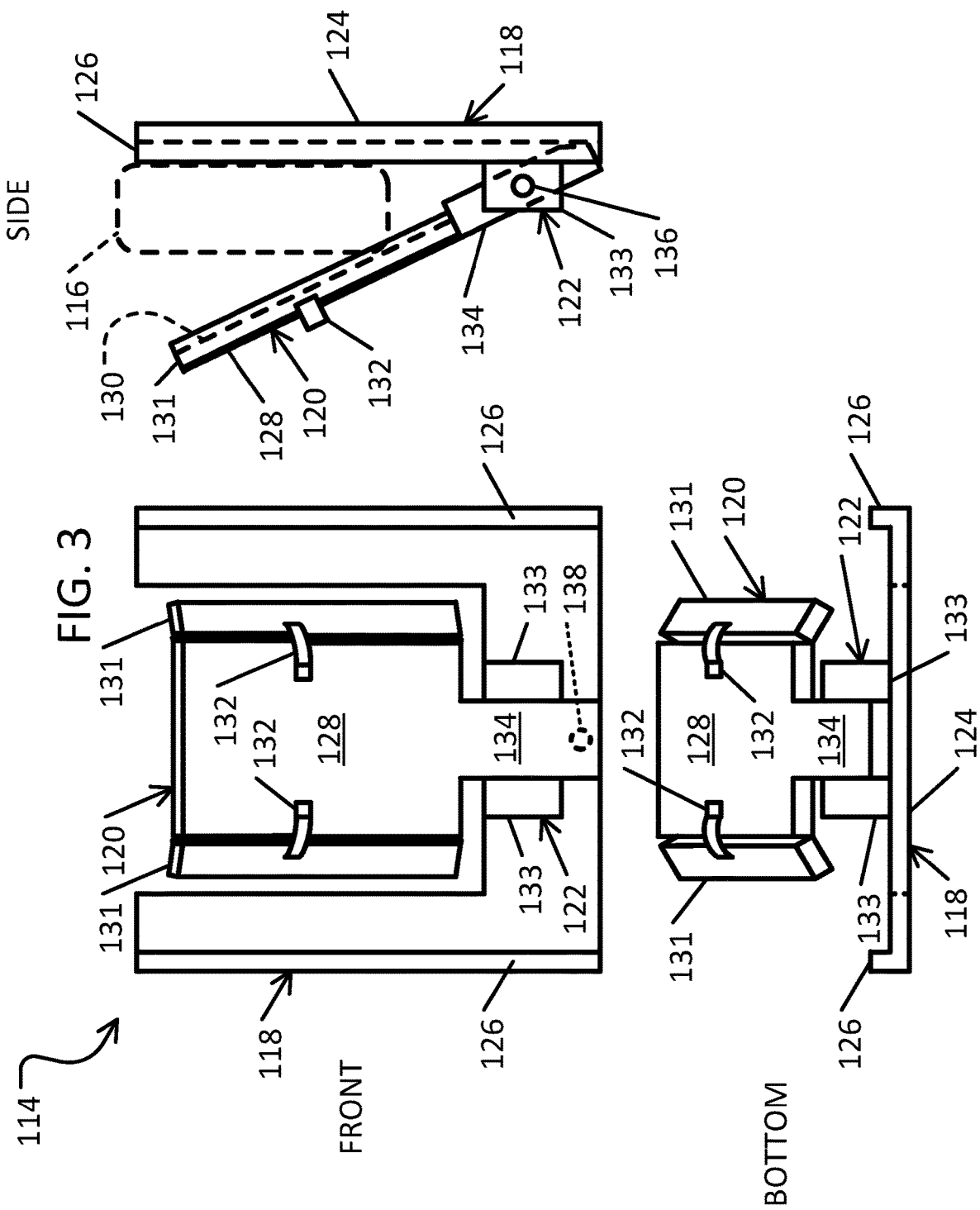
FIG. 3 is a multi-view (front, side, bottom) of the peripheral holder in a deployed configuration according to an embodiment of the present disclosure.

FIG. 2 is a multi-view (front, side, bottom) of peripheral holder 114 in a stowed configuration according to an embodiment of the present disclosure. FIG. 3 is a multi-view (front, side, bottom) of peripheral holder 114 in a deployed configuration according to an embodiment of the present disclosure. For example, peripheral holder 114 can be deployed for securing peripheral components, such as mouse 116 (shown in phantom in the "SIDE" portion of FIG. 3), and peripheral holder 114 can be stowed flat alongside, for example, laptop computer 102 (shown in FIG. 1) when not in use. FIGS. 2 and 3 will now be discussed in conjunction with one another.

In the illustrated embodiment, peripheral holder 114 comprises base 118, arm 120, and hinge 122. Hinge 122 which is connected to base 118 at the bottom end of base 118, and arm 120 is connected to hinge 122 at the bottom end of arm 120 (e.g., where a "bottom" end as discussed herein refers to the end which would be downward when a user is carrying laptop computer 102, shown in FIG. 1). Thereby, arm 120 faces and opposes base 118, in that the inner side of arm 120 faces the outer side of base 118, and arm 120 can rotate with respect to base 118 towards and away from base 118. More specifically, when arm 120 is alongside base 118 (see FIG. 2) (and laptop computer 102), peripheral holder 114 is stowed (e.g., in a stowed configuration), but when arm 120 is away from base 118 (see FIG. 3), peripheral holder 114 is deployed (e.g., in a deployed configuration).

In the illustrated embodiment, base 118 has a horseshoe shape that includes a planar mounting surface 124 on one side of base 118, and fences 126 extending from the opposite side of base 118. In some embodiments, mounting surface 124 includes a mounting feature for affixing peripheral holder 114 to laptop computer 102 (shown in FIG. 1). In other embodiments, the mounting feature is an adhesive (not shown), and in other embodiments, the mounting feature mates with a corresponding mounting feature on laptop computer 102, for example, a hook-and-loop fastener (not shown) wherein the hook portion is attached to one of mounting surface 124 or laptop computer 102 and the loop portion is attached to the other. Fences 126 are positioned on the outer edges of the opposite lateral sides of base 118 and are configured to inhibit peripheral components from moving laterally, for example, out of peripheral holder 114. In some embodiments, fences 126 are no more prominent than hinge 122. That is, the height of fences 126 is limited to the height of hinge 122 in some embodiments. In other embodiments, the fences of 126 are not limited to the height of hinge 122 and is determined based on other factors. For example, in some such embodiments, fences 126 are twice as tall as the thickness of the majority of base 118 regardless of the height of hinge 122.

In the illustrated embodiment, arm 120 comprises pad 128. Pad 128 can include a rubberized, sticky, textured, or otherwise friction-increasing feature on holding surface 130 thereof to prevent movement of peripheral components being held in peripheral holder 114. Furthermore, pad 128 includes two tabs 131 extending from the lateral edges of pad 128 and two curved flat springs 132 connected to pad 128 and in contact with tabs 132, respectively. Tabs 131 are rotatably connected to pad 128, for example, by a piano hinge, a live hinge, or other suitable joint. Tabs 131 are biased by curved flat springs 132 towards a deployed position in which tabs 131 extend toward base 118. This forms peripheral holder 114 into a pouch-shape which further prevents a peripheral device from moving laterally, for example, out of peripheral holder 114. In addition or in the alternative, while pad 128 is depicted as being flat in FIGS. 2 and 3, pad 128 can be curved and/or bent in one or two directions and/or be contoured to form a pouch-shape and/or to better correspond to the shape of peripheral components.

In the illustrated embodiment, hinge 122 comprises tabs 133, stem 134, pin 136, and spring 138. Tabs 133 are an integral portion of base 118, and stem 134 is an integral portion of arm 120 in this embodiment. In other embodiments, the tabs 135 and/or stem 134 can be otherwise attached to the base 118 or arm 120, respectively. Pin 136 extends laterally through tabs 133 and stem 134 to rotatably connect arm 120 to base 118. Spring 138 is positioned between base 118 and arm 120 to bias peripheral holder 114 into the stowed configuration. This biasing provides a holding force on any peripheral components when in the deployed configuration and urges peripheral holder 114 to collapse to the stowed configuration when peripheral holder 114 is not holding any peripheral components. Therefore, peripheral holder 114 can fold flat and be non-obtrusive when it is not in use. In addition, to limit the rotation of arm 120, stem 134 includes stopping surface 140 which contacts base 118 when peripheral holder 114 is in the deployed configuration.

Figure 4:
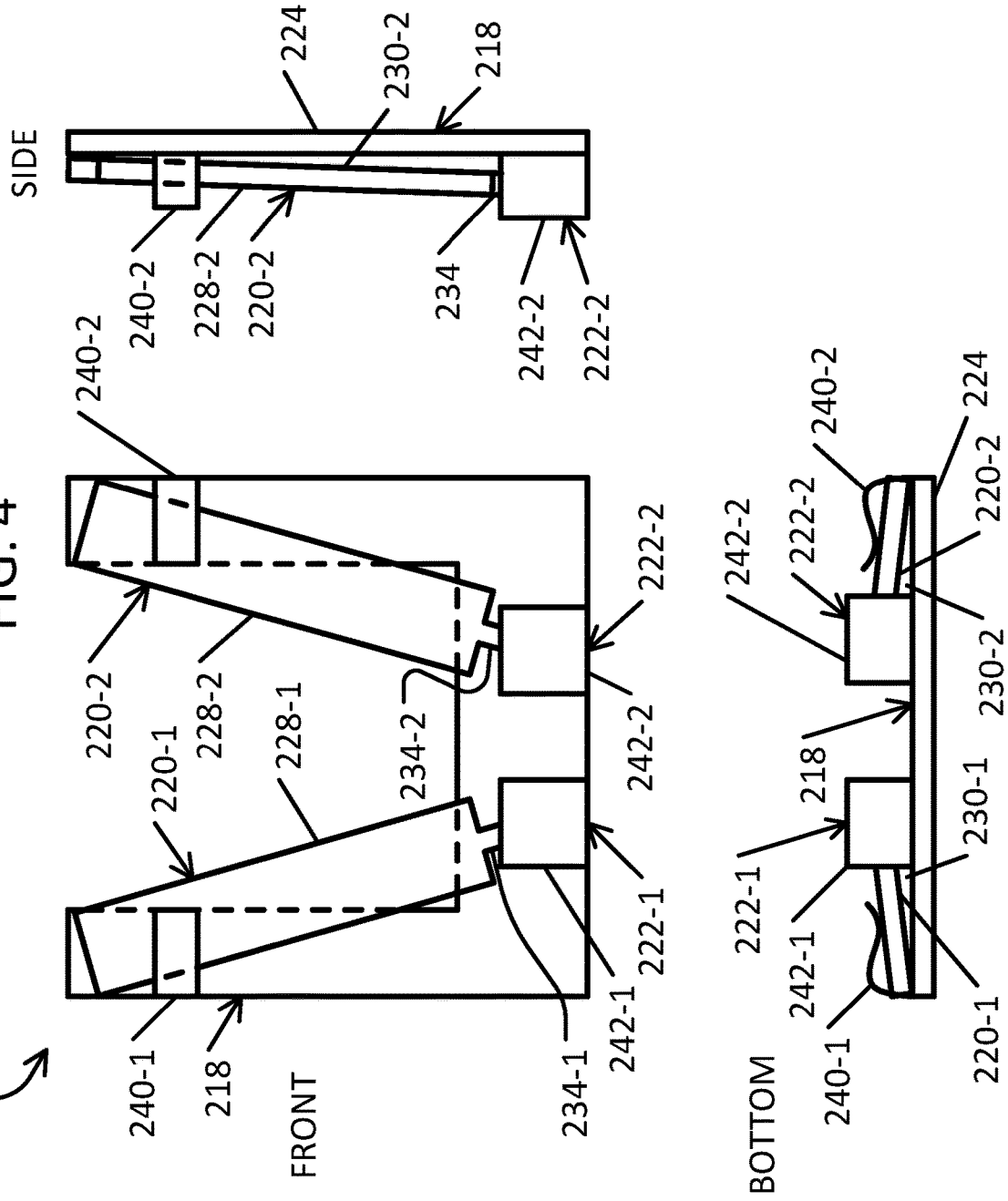
FIG. 4 is a multi-view (front, side, bottom) of an alternate peripheral holder in a stowed configuration according to an embodiment of the present disclosure.
Figure 5:
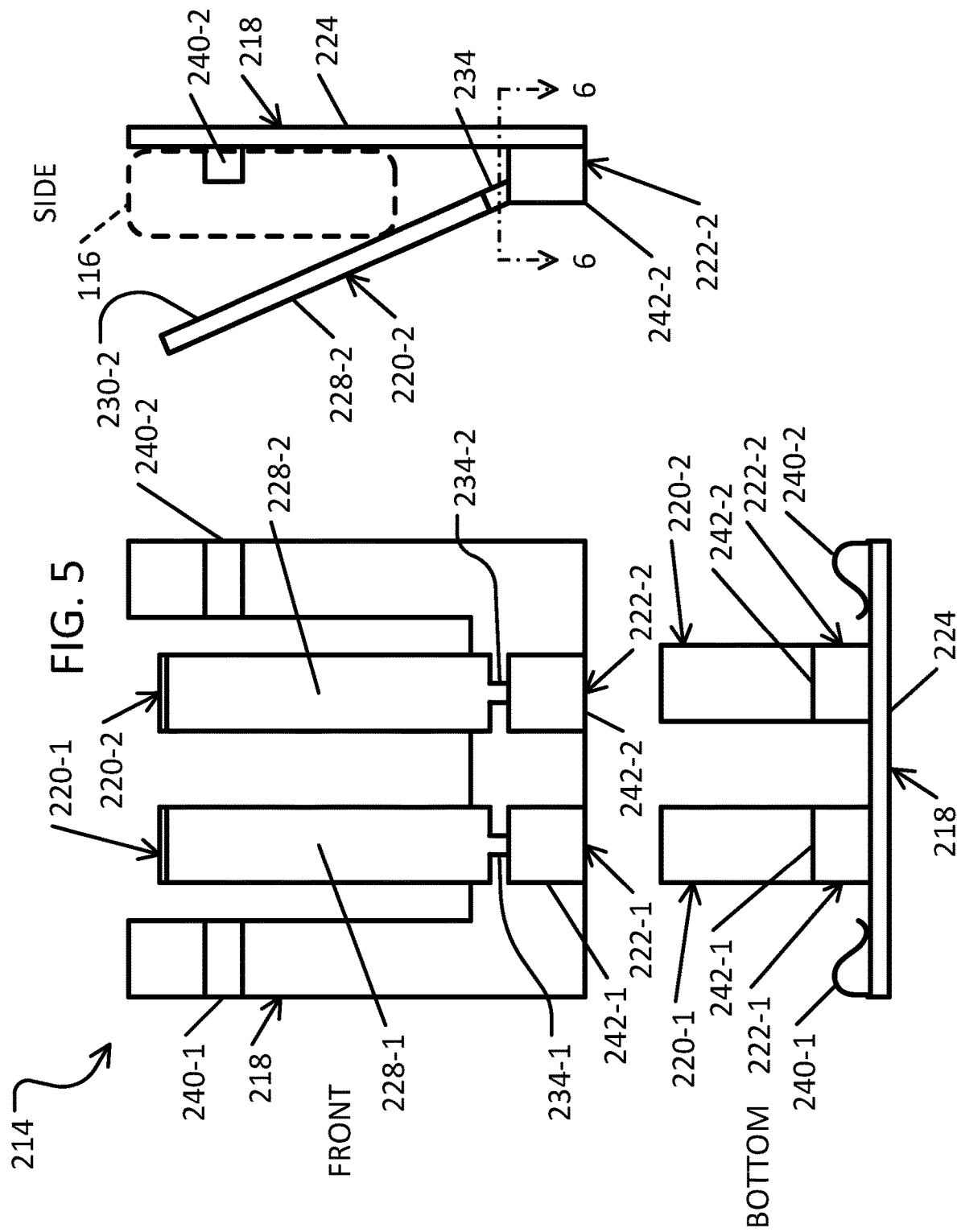
FIG. 5 is a multi-view (front, side, bottom) of the alternate peripheral holder in a deployed configuration according to an embodiment of the present disclosure.

FIG. 4 is a multi-view (front, side, bottom) of peripheral holder 214 in a stowed configuration according to an embodiment of the present disclosure. FIG. 5 is a multi-view (front, side, bottom) of peripheral holder 214 in a deployed configuration according to an embodiment of the present disclosure. For example, peripheral holder 214 can be deployed for securing peripheral components, such as mouse 116 (shown in phantom in the "SIDE" portion of FIG. 5), and peripheral holder 114 can be stowed flat alongside, for example, laptop computer 102 (shown in FIG. 1) when not in use. FIGS. 4 and 5 will now be discussed in conjunction with one another.

In the illustrated embodiment, peripheral holder 214 comprises base 218, arms 220-1 and 220-2 (collectively "arms 220"), and joints 222-1 and 222-2 (collectively "joints 222"). Joints 222 are connected at the bottom end of base 218, and arms 220 are connected to joints 222 at the bottom ends of arms 220, respectively. Thereby, arms 220 face and oppose base 218, and arms 220 can rotate and swivel with respect to base 218 towards and away from base 218. More specifically, when arms 220 are alongside base 218 (see FIG. 4) (and laptop computer 102), peripheral holder 214 is stowed, but when arms 220 are away from base 218 (see FIG. 5), peripheral holder 214 is deployed.

In the illustrated embodiment, base 218 has a horseshoe shape that includes a planar mounting surface 224 on one side of base 218, and clips 240-1 and 240-2 (collectively "clips 240") extending from the opposite side of base 218. In some embodiments, mounting surface 224 includes a mounting feature for affixing peripheral holder 214 to laptop computer 102 (shown in FIG. 1). In other embodiments, the mounting feature is an adhesive (not shown), and in other embodiments, the mounting feature mates with a corresponding mounting feature on laptop computer 102, for example, a hook-and-loop fastener (not shown) wherein the hook portion is attached to one of mounting surface 224 or laptop computer 102 and the loop portion is attached to the other. Clips 240 are positioned on the outer edges of the opposite lateral sides of base 218 and are configured to secure arms 220 against base 218, for example, by elastic deformation/spring force, when peripheral holder 214 is in the stowed configuration. In other embodiments, there are other mechanisms to secure arms 220, such as magnets or hook-and-loop fasteners. In addition, clips 240 inhibit peripheral components from moving laterally, for example, out of peripheral holder 214. In some embodiments, clips 240 are no more prominent than joints 222.

In the illustrated embodiment, arms 220-1 and 220-2 comprise pads 228-1 and 228-2 (collectively "pads 228"). Pads 228 can include a rubberized, sticky, textured, or otherwise friction-increasing feature on holding surfaces 230-1 and/or 230-2 (collectively "holding surfaces 130") thereof to prevent movement of peripheral components being held in peripheral holder 214. In some embodiments, each pad 228 can include one or more flaps that are similar to or the same as flaps 131 shown in FIG. 3. In addition or in the alternative, while pads 228 are depicted as being flat in FIGS. 4 and 5, pads 228 can be curved or bent in one or two directions and/or be contoured to form a pouch-shape and/or to better correspond to the shape of peripheral components.

In the illustrated embodiment, joints 222-1 and 222-2 are spherical joints that comprise housings 242-1 and 242-2 (collectively "housings 242") and stems 234-1 and 234-2 (collectively "stems 234"), respectively. In this embodiment, housings 242 are integral portions of base 218, and stems 234-1 and 234-2 are integral portions of arms 120-1 and 120-2, respectively. Joints 222 allow for arms 220 to rotate away from base 218 and allow for some lateral rotation as well. Thereby, arms 220 can extend outward from base 218 when peripheral holder 214 is in the deployed configuration, and arms 220 can be held by clips 240 when peripheral holder 214 is in the stowed configuration. Such a configuration allows peripheral holder 214 to fold flat and be non-obtrusive when it is not in use, and also allows base 218 to have a horseshoe shape, which saves material cost and weight.

Figure 6:
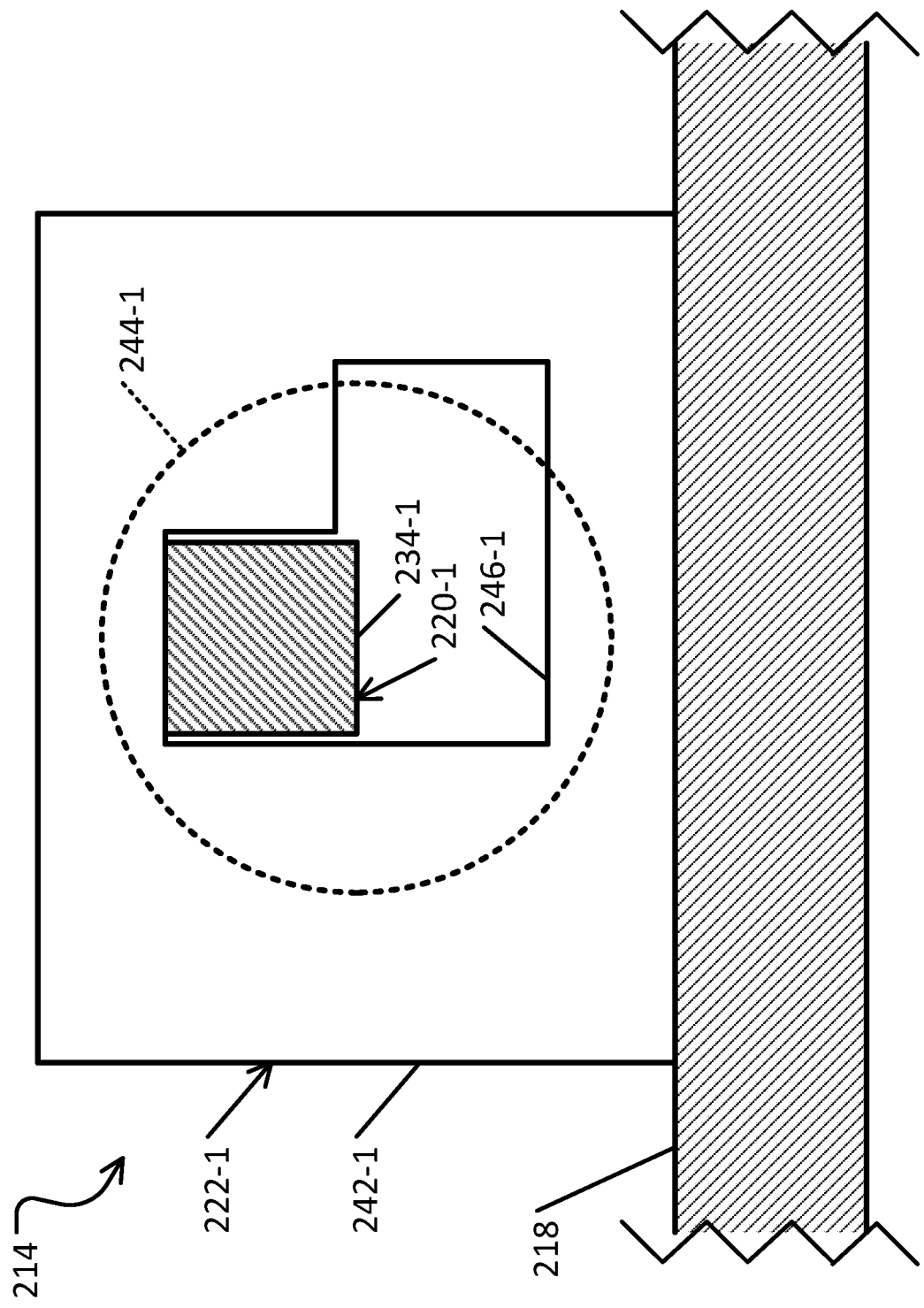
FIG. 6 is a cross-sectional view of the alternate peripheral holder as indicated by line 6-6 in FIG. 5 according to an embodiment of the present disclosure.

FIG. 6 is a cross-sectional view of peripheral holder 214 as indicated by line 6-6 in FIG. 5 according to an embodiment of the present disclosure. As stated previously, joint 222-1 is a spherical joint, so arm 220-1 includes ball 244-1 at the end of stem 234-1 which sits in a corresponding spherical void in housing 242-1. Thereby, housing 242-1 also includes opening 246-1, through which stem 234-1 passes. In order to allow arm 220-1 to rotate and swivel between the stowed configuration and the deployed configuration, opening 246-1 is L-shaped. More specifically, the horizontal portion of the L-shape allows arm 220-1 to be inserted into and extracted from clip 240-1 (shown in FIG.

5), and the vertical portion of the L-shape allows arm 220-1 to pivot away from and toward base 218, which opens and closes the region where peripheral device (such as mouse 116, shown in FIG. 5) is held, respectively.

While FIG. 6 only shows joint 222-1, joint 222-2 can have a similar configuration. However, joint 222-2 would be a right-to-left mirror image of joint 222-1, such that opening 246-2 is a backward L-shape also referred to herein as a J-shape. Thereby, the horizontal portion of the J-shape allows arm 220-2 to be inserted into and extracted from clip 240-2 (shown in FIG. 5), and the vertical portion of the J-shape allows arm 220-2 to pivot away from and toward base 218, which opens and closes the region where peripheral device (such as mouse 116, shown in FIG. 5) is held, respectively.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device holder comprising:
a base including a mounting feature configured to affix the device holder to a portable computer device;
a first hinge connected to the base; and
a first arm connected to the first hinge and opposing the base, wherein:
the first arm is rotatable with respect to the base to change the device holder between a stowed configuration, when the arm is positioned alongside the base, and a deployed configuration, when the first arm is positioned away from the base; and
the first arm comprises:
a stem connected to the first hinge and a pad connected to the stem; and
a stopping surface of the stem that contacts the base when the device holder is in the deployed configuration;
wherein the device holder is configured to hold a peripheral device of the portable computer device when the device holder is in the deployed configuration.

2. The device holder of claim 1, wherein the peripheral device is a mouse.

3. The device holder of claim 1, wherein the mounting feature is adhesive.

4. The device holder of claim 1, wherein the first arm comprises:
a friction-increasing feature on a holding surface of the pad that faces the base.

5. The device holder of claim 1, further comprising:
a biasing member positioned between the base and the first arm, wherein the biasing member urges the device holder towards the stowed configuration.

6. The device holder of claim 1, further comprising:
a second hinge connected to the base; and
a second arm connected to the second hinge and opposing the base.

7. The device holder of claim 6, wherein the first hinge is a first spherical joint, and the second hinge is a second spherical joint.

8. The device holder of claim 7, wherein the first spherical joint includes a first housing with an L-shaped opening through which the first arm passes, and the second spherical joint includes a second housing with a J-shaped opening through which the second arm passes.

9. The device holder of claim 6, further comprising:
a first clip connected to the base for securing the first arm when the device holder is in the stowed configuration; and
a second clip connected to the base for securing the second arm when the device holder is in the stowed configuration.

10. A portable computer system comprising:
a portable computer;
a peripheral device that is external to the portable computer and communicatively connected to the portable computer;
a device holder that is affixed to the portable computer and configured to hold the peripheral device, the device holder comprising:
a base;
a first hinge connected to the base; and
a first arm connected to the first hinge and opposing the base, wherein:
the first arm is rotatable with respect to the base to change the device holder between a stowed position, when the arm is positioned alongside the portable computer, and a deployed configuration, when the first arm is positioned away from the portable computer; and
the first arm comprises:
a stem connected to the first hinge and a pad connected to the stem; and
a stopping surface of the stem that contacts the base when the device holder is in the deployed configuration.

11. The portable computer system of claim 10, wherein the peripheral device is a mouse.

12. The portable computer system of claim 10, wherein the base is affixed to the portable computer with adhesive.

13. The portable computer system of claim 10, wherein the first arm comprises:
a friction-increasing feature on a holding surface of the pad that faces the base.

14. The portable computer system of claim 10, further comprising:
a biasing member positioned between the base and the first arm, wherein the biasing member urges the first arm towards the portable computer.

15. The portable computer system of claim 10, further comprising:
a second hinge connected to the base; and
a second arm connected to the second hinge and opposing the base.

16. The portable computer system of claim 15, wherein the first hinge is a first spherical joint, and the second hinge is a second spherical joint.

17. The portable computer system of claim 16, wherein the first spherical joint includes a first housing with an L-shaped opening through which the first arm passes, and the second spherical joint includes a second housing with a J-shaped opening through which the second arm passes.

18. The portable computer system of claim 15, further comprising:
a first clip connected to the base for securing the first arm when the device holder is in the stowed configuration; and a second clip connected to the base for securing the second arm when the device holder is in the stowed configuration.

\* \* \* \* \*